US010776174B2

(12) United States Patent
Walters et al.

(10) Patent No.: US 10,776,174 B2
(45) Date of Patent: Sep. 15, 2020

(54) MANAGING HOSTED RESOURCES ACROSS DIFFERENT VIRTUALIZATION PLATFORMS

(71) Applicant: Amazon Technologies, Inc., Seattle, WA (US)

(72) Inventors: Matthew Walters, Seattle, WA (US); Tanmoy Dutta, Sammamish, WA (US); Barry B. Hunter, Jr., Issaquah, WA (US); Grant Alexander Macdonald McAlister, Seattle, WA (US); Daniel Myers, Maple Valley, WA (US); Rahul Nambiar, Vancouver (CA); Bharath Subramanian Pichai, Kirkland, WA (US); Mark Porter, Seattle, WA (US); Dennis Tighe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 15/988,826

(22) Filed: May 24, 2018

(65) Prior Publication Data
US 2019/0361748 A1  Nov. 28, 2019

(51) Int. Cl.
G06F 9/455 (2018.01)
G06F 9/50 (2006.01)
H04L 29/08 (2006.01)

(52) U.S. Cl.
CPC ............ G06F 9/5077 (2013.01); G06F 9/455 (2013.01); H04L 67/10 (2013.01)

(58) Field of Classification Search
CPC ......... G06F 9/5077; G06F 9/455; H04L 67/10
See application file for complete search history.

(56) References Cited

U.S. PATENT DOCUMENTS

| 7,752,633 | B1 | | 6/2010 | Fleming | |
|---|---|---|---|---|---|
| 8,307,003 | B1 | * | 11/2012 | Sheth | G06F 16/958 707/790 |
| 9,112,841 | B1 | * | 8/2015 | Brandwine | H04L 63/08 |
| 9,485,323 | B1 | * | 11/2016 | Stickle | H04L 67/32 |
| 10,348,825 | B2 | * | 7/2019 | Rao | H04L 63/029 |
| 2007/0067769 | A1 | | 3/2007 | Geisinger | |

(Continued)

FOREIGN PATENT DOCUMENTS

CN  103092670  5/2013

OTHER PUBLICATIONS

International Search Report and Written Opinion from PCT/US2019/033231, (Amazon Technologies, Inc.), dated May 21, 2019, pp. 1-13.

Primary Examiner — Diem K Cao
(74) Attorney, Agent, or Firm — Robert C. Kowert; Kowert, Hood, Munyon, Rankin & Goetzel, P.C.

(57) ABSTRACT

Resources hosted in different virtualization platforms may be managed across the different virtualization platform. Requests to perform types of actions with respect to a resource hosted in a type of virtualization platform may be received. Mapping information between types of actions and actions available via interfaces for different types of virtualization platforms may be evaluated to select actions for an interface of the type of virtualization platform that hosts the resource. The selected actions may then be performed via the interface to perform the action with regard to the resource.

20 Claims, 9 Drawing Sheets

(56) References Cited

U.S. PATENT DOCUMENTS

| | | | |
|---|---|---|---|
| 2010/0312851 A1* | 12/2010 | Jackson | H04L 67/104 709/217 |
| 2015/0339136 A1* | 11/2015 | Suryanarayanan | G06F 9/455 718/1 |
| 2015/0350102 A1 | 12/2015 | Leon-Garcia et al. | |
| 2016/0085594 A1* | 3/2016 | Wang | H04L 67/18 709/226 |
| 2017/0243153 A1* | 8/2017 | Kass | G06F 17/243 |
| 2017/0286272 A1* | 10/2017 | Yang | G06F 11/3668 |

* cited by examiner

MANAGING HOSTED RESOURCES ACROSS DIFFERENT VIRTUALIZATION PLATFORMS

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling to meet demand, many computing-related systems or services are implemented as distributed applications, each application being executed on a number of computer hardware servers. For example, a number of different software processes executing on different computer systems may operate cooperatively to implement a computing service. When more service capacity is needed, additional hardware or software resources may be deployed to increase the availability of the computing service.

In order to add hardware or software resources, different networks hosting different resources of a distributed system may provide further opportunities for increasing computing resource capacity. Managing resources at scale, however, can be challenging in scenarios where the resources are implemented in different locations, networks, systems, or services which may implement different virtualization platforms for hosting the resources. Thus techniques that facilitate management across different locations and virtualization systems may be highly desirable in order to take advantage of scaling distributed systems beyond the resources of any one service, network, or location.

Figure 1:
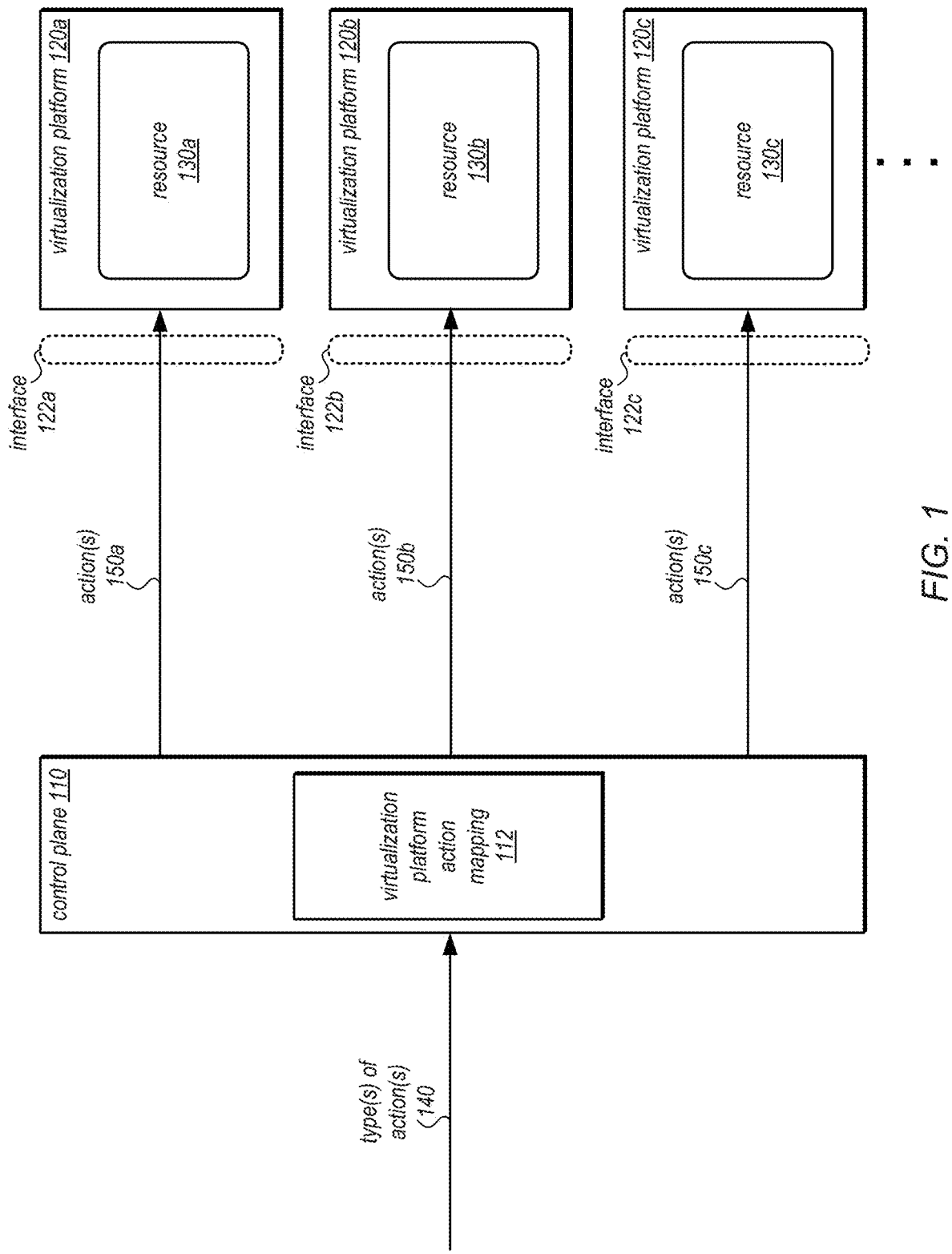
FIG. 1 is a logical block diagram illustrating managing hosted resources across different virtualization platforms, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

In various embodiments, managing hosted resources across different virtualization platforms may be implemented. Computing resources may be utilized to implement various types of systems, in some embodiments. Distributed systems, for example, may utilize one or more database servers or instances, to provide information in order to support transactions or functions (e.g., by providing or modifying associated data) for an application (e.g., financial transactions, gaming platforms, communication data, metrics collection or logging information, among others), in some embodiments. Resources may be implemented in different environments or virtualization platforms so that even though a same resource can be implemented in multiple locations, the infrastructure that hosts resource may vary, in some embodiments (e.g., the same resource may be the same type of application, such as a same database engine, hosted in different networks that use a different virtualization platform to host the same application).

For example, virtualization platforms may include the operating system, virtual machine manager hosting a resource, software container (e.g., operating system virtualization), or larger system or service implementing the resource (e.g., a database service of a provider network that offers a database engine). Some virtualization platforms may, in some embodiments, offer different advantages. For example, a virtualization platform that is implementing resources as part of a provider network service may include various automated management features, controls to manage similar resources with custom or highly-specialized features, or other operations that can be manually specified that may be different than those management features offered by a different virtualization platform that implements the same resources (e.g., different management features may be offered by different virtualization platforms capable of hosting the same database engine or other application), in some embodiments.

Managing hosted resources across different virtualization platforms may allow users to take advantage of the different management capabilities in one virtualization platform and extend those benefits to resources hosted in a different virtualization platform. For example, a user who implements resources in a private and/or on-premise data center that implement one type of virtualization platform (which may offer a small set of management features) could utilize a provider network service implementing a different virtualization platform and a much larger set of management features to manage the resources in the private and/or on-premise data center. In this scenario, and other examples, the performance optimizations enabled by a rich set of management features may not be limited to a single virtualization platform or service but can be extended to cover multiple different virtualization platforms. Moreover, users can utilize a simplified management apparatus for complex and widely distributed systems through a unified control interface, which may allow for significantly faster responses to changing conditions (e.g., errors or increased demand on resources), improving the performance of distributed systems (e.g., coordinating data transfers, handling failures, or other events that could necessitate a fast response in order to ensure system resiliency and/or availability) that include resources implemented across different virtualization platforms as communication or management barriers that existed between the different virtualization platform may be removed.

FIG. 1 is a logical block diagram illustrating managing hosted resources across different virtualization platforms, according to some embodiments. Virtualization platforms 120a, 120b, and 120c may respectively implement different resources 130a, 130b, and 130c. In at least some embodiments, the resources 130 may be the same type of resource (e.g., the same database engine, application server, virtual compute slot, or other computing resource) while at least one of virtualization platforms 120 may be different (e.g., a different type of virtual machine management system, a different service implementing the resource, etc.).

Control plane 110 may offer one or multiple types of actions that may be performed with respect to the resources, in some embodiments. For example, the types of actions may include, but are not limited to manual actions to create, delete, modify, start, stop or pause resource actions or work or automated actions to handle failure scenarios, demand or utilization scenarios, other automatically performed actions, as discussed below with regard to FIG. 8. Control plane 110 may implement a centralized interface which allows requests to perform different types of actions 140 to be accepted with respect to a particular resource (e.g., hosted in a different system, service, or other location with a different virtualization platform) and performed by selecting respective actions 150 that are available in the interface 122 that corresponds to the type of virtualization platform 120 at which the resource is implemented. Virtualization platform action mapping 112 may be evaluated to map action types to one or more corresponding actions to accomplish the type of action via each different interface according to the various techniques discussed below with regard to FIGS. 2-8. For instance, virtualization platform mapping 112 may include one or more decision trees for a respective interface 122 which may be evaluated to determine which actions (and order of actions) should be performed to accomplish the type of action 140. Thus when a request to perform a type of action 140 that is directed to resource 130a, then the available actions of virtualization platform 120a that can be invoked via interface 122a may be considered in order to select the actions that can accomplish the desired type of action.

Because the virtualization platforms 120 may offer different management features the available actions may be different between the different virtualization platforms, in some embodiments. For example, some virtualization platforms 120 may offer multiple different types of actions to take a backup copy of data (e.g., for a database that is a resource 130), while other virtualization platforms may implement less or one backup action. In some embodiments, a request to perform a type of action 140 for which no supported actions 150 are available may be rejected or returned with an error indication.

Please note, FIG. 1 is provided as a logical illustration of a control plane, virtualization platform action mapping, interfaces, resources, virtualization platforms, and respective interactions and is not intended to be limiting as to the physical arrangement, size, or number of components, modules, or devices to implement such features.

The specification first describes an example database service that utilizes managing hosted resources across different virtualization platforms. Included in the description of the example network-based database service are various aspects of the example network-based, database service, as well as interactions with other resources in other types of networks, such as other provider networks or private networks. The specification then describes flowcharts of various embodiments of methods for implementing managing hosted resources across different virtualization platforms. Next, the specification describes an example system that may implement the disclosed techniques. Various examples are provided throughout the specification.

Figure 2:
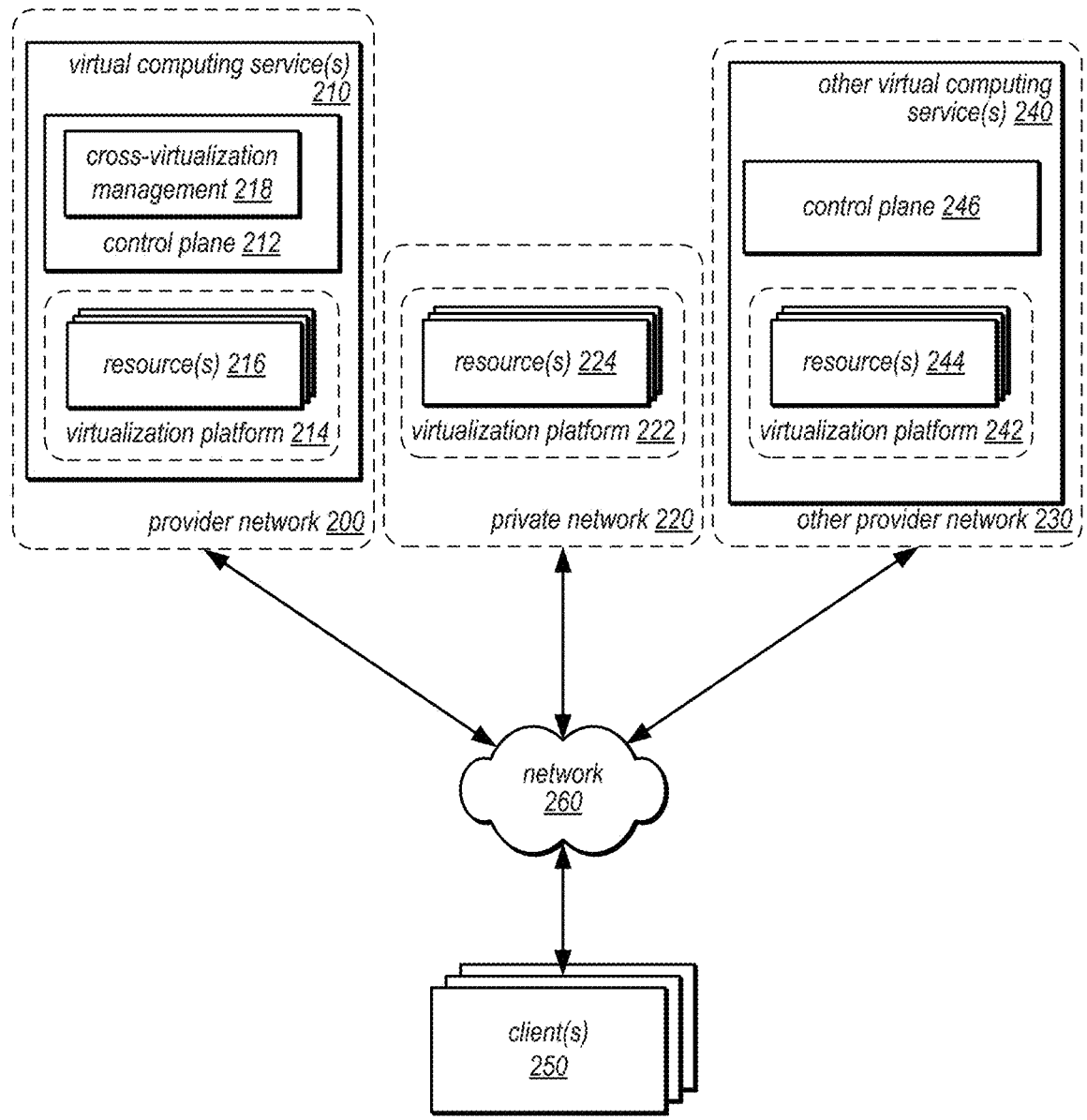
FIG. 2 is a logical block diagram illustrating a provider network that offers a service that can manage resources across virtualization platforms in other networks, according to some embodiments.

FIG. 2 is a logical block diagram illustrating a provider network that offers a service that can manage resources across virtualization platforms in other networks, according to some embodiments. A provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network 200.

A number of clients (shown as clients 250 may interact with a provider network 200 via a network 260, in some embodiments. Provider network 200 may implement virtual computing services 210. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client that can submit network-based services requests to provider network 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a service client) may provide access to network-based service to other applications in a manner that is transparent to those applications. For example, client 250 may be may integrate with an operating system or file system to provide storage. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 250 and the operating system or file system on behalf of applications executing within the operating system environment. Although client(s) 250 are illustrated as external to provider network 200, in some embodiments, internal clients, such as applications or systems implemented on other virtual computing resources may make use of a database hosted by a database service, including clients implement in private network 220 or other provider network 230.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network 200 using a private network rather than the public Internet.

Provider network 200 may implement one or more service endpoints may receive and process network-based services requests, such as requests to access data pages (or records thereof). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements virtual computing service(s) 210 for processing. In other embodiments, provider network 200 may be implemented as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

Provider network 200 may implement various client management features. For example, provider network 200 may coordinate the metering and accounting of client usage of network-based services such as by tracking the identities of requesting clients 250, the number and/or frequency of client requests, the amount of data stored or retrieved on behalf of clients 250, the number of operations performed on behalf of clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of virtual computing service(s) 210.

Provider network 200 may implement various virtual computing services 210 which may host resource(s) 216 in a virtual platform 214 for use by a client 250 (or other clients hosted internal to provider network 200, such as may be implemented on another system or service, or hosted external to provider network, such as in private network 220 or other provider network 230). Virtual computing services 210 may include various services to that offer data storage (e.g., object storage, virtual file-systems, database services, including relational and non-relational or no-SQL databases), stream processing or reporting services, communication services (e.g., messaging services), computation services (e.g., Big Data processing, machine learning, image processing, encryption, compression, etc.), general purpose computing, software-as-a-service, application-as-a-service, or infrastructure-as-a-service, among other virtual computing services. Resource(s) 216 may be, for example, virtual compute instances which can be provisioned or otherwise utilized for implementing various applications, tools, or other functions one or more compute instances.

Virtual computing service(s) 210 may implement control plane 212. Control plane 212 may perform various service and/or resource management operations including operations to create, monitor, repair, provision, secure, configure, delete, halt, or stop resource(s) 216. In various embodiments, control plane 212 may implement cross-virtualization management 218 to implement managing hosted resources across different virtualization platforms, as discussed in detail below with regard to FIGS. 3-6. Cross-virtualization management 218 may allow for control plane 212 to perform different types of actions with respect to resources hosted in different virtualization platforms.

For example, private network 220 which may be accessible to provider network 200 via network 260 (e.g., via a Wide Area Network) may be an on-premise set of resources for an entity, such as a corporation or organization, protected by private network security controls, access mechanisms, or infrastructure. Resources 224 may be implemented on virtualization platform 222 and may be a same type of resource as resources 216. Cross-virtualization management 218 may allow for resource(s) 224 to be managed by control plane 212 even though the virtualization platform 222 may be different than virtualization platform 214. Similarly, another provider network 230 may host resource(s) 244 as part of other virtual computing service(s) 240, which may utilize virtualization platform 242. As with private network 220, cross-virtualization management 218 may allow control plane 212 to perform management operations with respect to resource(s) 244, in some embodiments. As discussed above with regard to provider network 200, other provider network 230 may implement features such as control plane 246 to perform various provider network operations (as discussed above). In some embodiments, private network 220 or other provider network 230 may offer interfaces, consoles, or other management tools for operating or managing the respective resources 224 and 244 and could also implement cross-virtualization management features (not illustrated).

Figure 3:
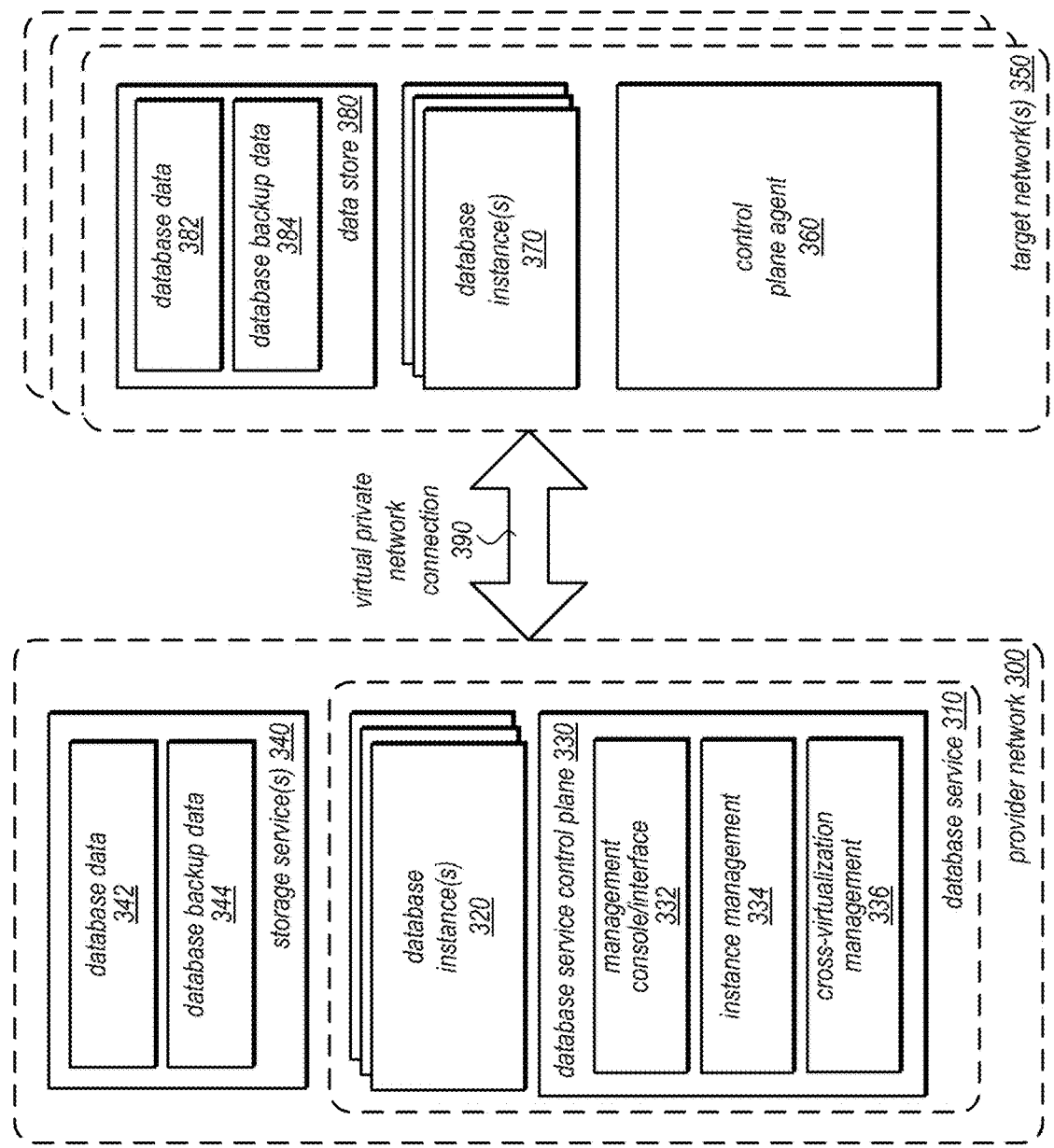
FIG. 3 is a logical block diagram illustrating a database service that can manage database instances across virtualization platforms, according to some embodiments.

FIG. 3 is a logical block diagram illustrating a database service that can manage database instances across virtualization platforms, according to some embodiments. Provider network 300 (e.g., similar to provider network 200 in FIG. 2) may implement database service 310, which may provide a visualization platform for hosting database resources, such as database instance(s) 320. Database service 310 may implement one or more database instance(s) 320, which may provide access to database data 342 (e.g., tables) and database backup data 344 (e.g., partial or complete snapshots, change logs, or other information for restoring a database) stored in storage service 340 (e.g., a virtual file system or block-based data store), in some embodiments. Client(s) of database service 310 which may be similar to clients 250 in FIG. 2 above, in some embodiments.

Database instance(s) 320 may implement query engines to perform and execute database queries directed to a database, in various embodiments. For example, a query engine may implement various query parsing, planning, and other features to determine what operations to perform in order to carry out and respond to a database query received from a client. A query engine may implement various cost modeling features in order to select different query operations in order to determine a most cost efficient plan, in some embodiments. A query engine may execute generated query plans to perform database queries, in various embodiments. Different query operations may involve instructions to a storage engine (which may also be implemented as part of database instance(s) 320 or as part of a separate storage service 340 to obtain various data from one or more tables in a database, for example, in some embodiments.

Database service 310 may also implement database service control plane 330, in various embodiments. Control plane 330 may provide, for instance, an interface or management console 332 which may allow users to separately control or manage database instances (e.g., outside of an application client connected to the database engine hosts), as discussed below with regard to FIGS. 5 and 6. Database service control plane 330 may also implement instance management 354 to perform various host management operations, including health checks and monitoring, host repair, provisioning and decommissioning hosts for database engines, updating or deploying different software to database engine hosts, or other types of actions requested by a client, among others. As discussed in detail below, database service control plane may also implement cross-virtualization management 336 to manage database instance(s) 320 as well as those database instances 370 in different target network(s) 350 that are visible to control plane 330.

Target networks 350 may be private networks (e.g., private network 220 in FIG. 2), other provider networks (e.g., provider network 230 in FIG. 2), or other networks that host database instance(s) 370 external to provider network 300. In at least some embodiments, the virtualization platform for database instance(s) 370 may be different than the virtualization platform implementing database instances 320. Similar to database instance(s) 320, database instances 370 may utilize data store 380 to store database data 382 and database backup data 384. Data stored in data store 380 may be stored in a different format than data stored in storage service(s) 340, in some embodiments.

In at least some embodiments, control plane agent 360 may be deployed to target network(s) 350 (e.g., at a separate host system or as part of a host system for data store 380 or database instance(s) 370). Control plane agent 360 may be a virtual appliance or other component that provides an interface to management features in the virtualization platform for database instances 370. Control plane agent 360 may act as a proxy for control plane 330 in target network 350 to perform requested actions, in some embodiments. Although not illustrated in FIG. 3, target network(s) 350 could implement interface(s) and/or control plane systems which control plane agent 360 may operate with in addition to or instead of resources like database instance(s) 370 directly, in some embodiments. In at least some embodiments, provider network 300 and target network(s) 350 may be able to communicate information via virtual private network connection 390 (which may be implemented using various security protocols or mechanisms, such as tunneling, over a public network as illustrated in FIG. 2), in some embodiments. However, in some embodiments, other types of network connections, including public network connections or other security protocols or mechanisms may be implemented to facilitate communication between provider network 300 and target network(s) 350 and thus the virtual private network connection 390 is not intended to be limiting as to other communication connections that may be utilized between provider network 300 and target network(s) 350.

Figure 4:
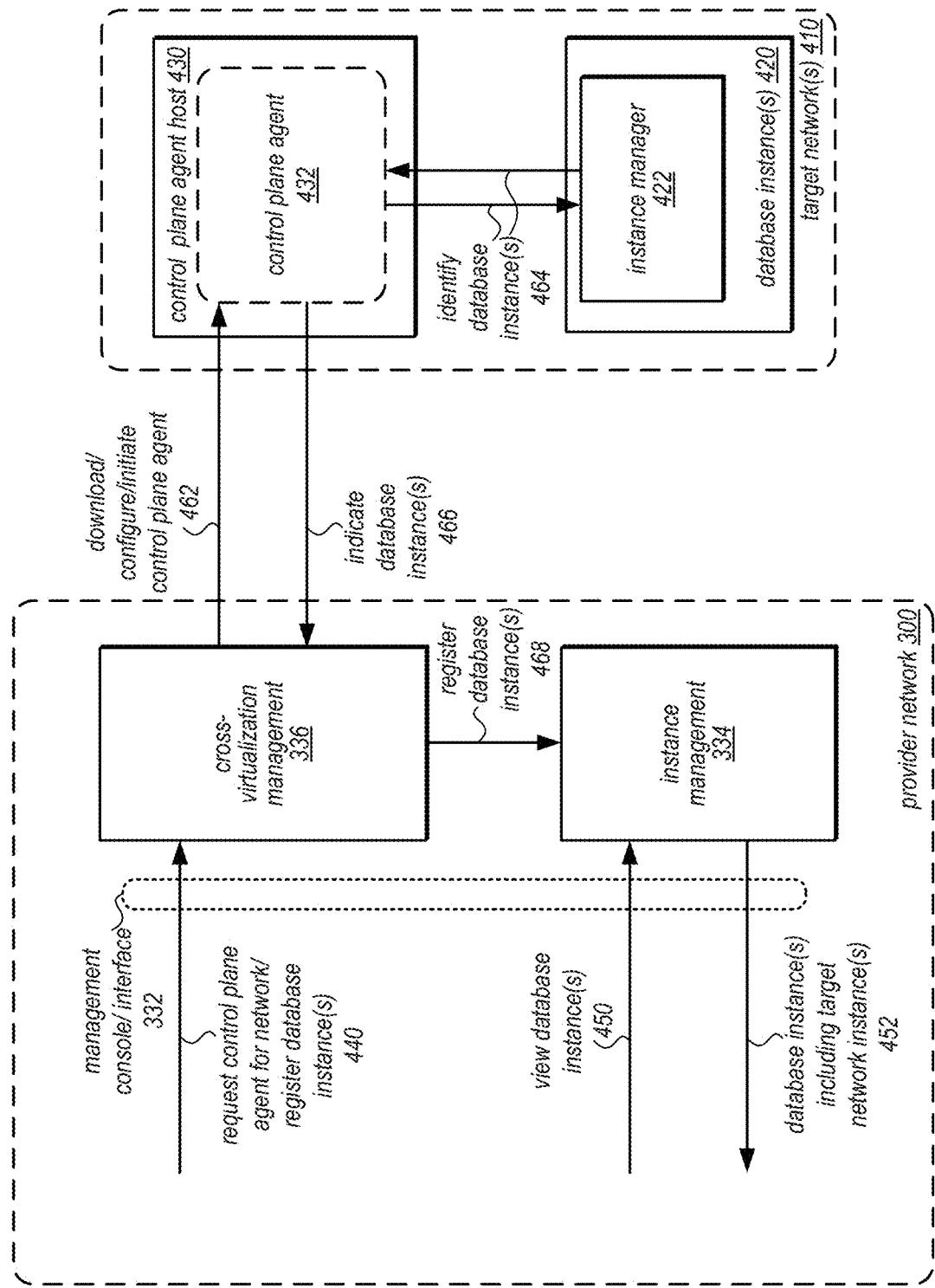
FIG. 4 is a logical block diagram illustrating interactions between a database service in a provider network and target networks in order to identify database instances in target networks for management, according to some embodiments.

As discussed above with regard to FIG. 3, a control plane agent may be implemented in some embodiments to act as a proxy for the control plane in a target network. FIG. 4 is a logical block diagram illustrating interactions between a database service in a provider network and target networks in order to identify database instances in target networks for management, according to some embodiments. As indicated at 440 a request may be received for a control plane agent for a target network 410 and/or to register database instances therein via management console interface 332. Cross-virtualization management 336 may download, configure/, initiate and/or otherwise deploy control plane agent 462 to a control plane agent host 430 as control plane agent 432. In some embodiments, the control plane agent may be sent to another system control by a requesting client, which may then be sent to control plane agent host 430 for installation. In some embodiments, a control plane and/or management interface of a target network(s) 410 may register, install, or give permission to control plane agent 432 to perform various operations within target network(s) 410 (not illustrated).

In some embodiments, control plane agent 432 may perform automated discovery of resources, such as database instance(s) 420. For example control plane agent 432 may send requests that poll or check the liveness of database instance(s) 420 to instance manager 422 (which may be manager implemented by the virtualization platform of target network(s) 410). Once identified, at 464, control plane agent 432 may send indications of the database instances 466 to cross-virtualization management 336, which in turn may register the database instance(s) 468 with instance management 334 (as instance management 334 may be agnostic to or unaware of which database instance(s) are in provider network 300 or in target network(s) 410 in some embodiments). A user can then view database instance(s) 450 via management console/interface 332 and receive back available/visible database instances including target network instance(s) 452 (along with database instance(s) hosted in provider network 300 or other target networks—not illustrated). In some embodiments, control plane agent 432 may only be able to communicate or manage database instance(s) 420 created by that control plane agent (e.g., via a request at provider network 300—not illustrated).

Figure 5:
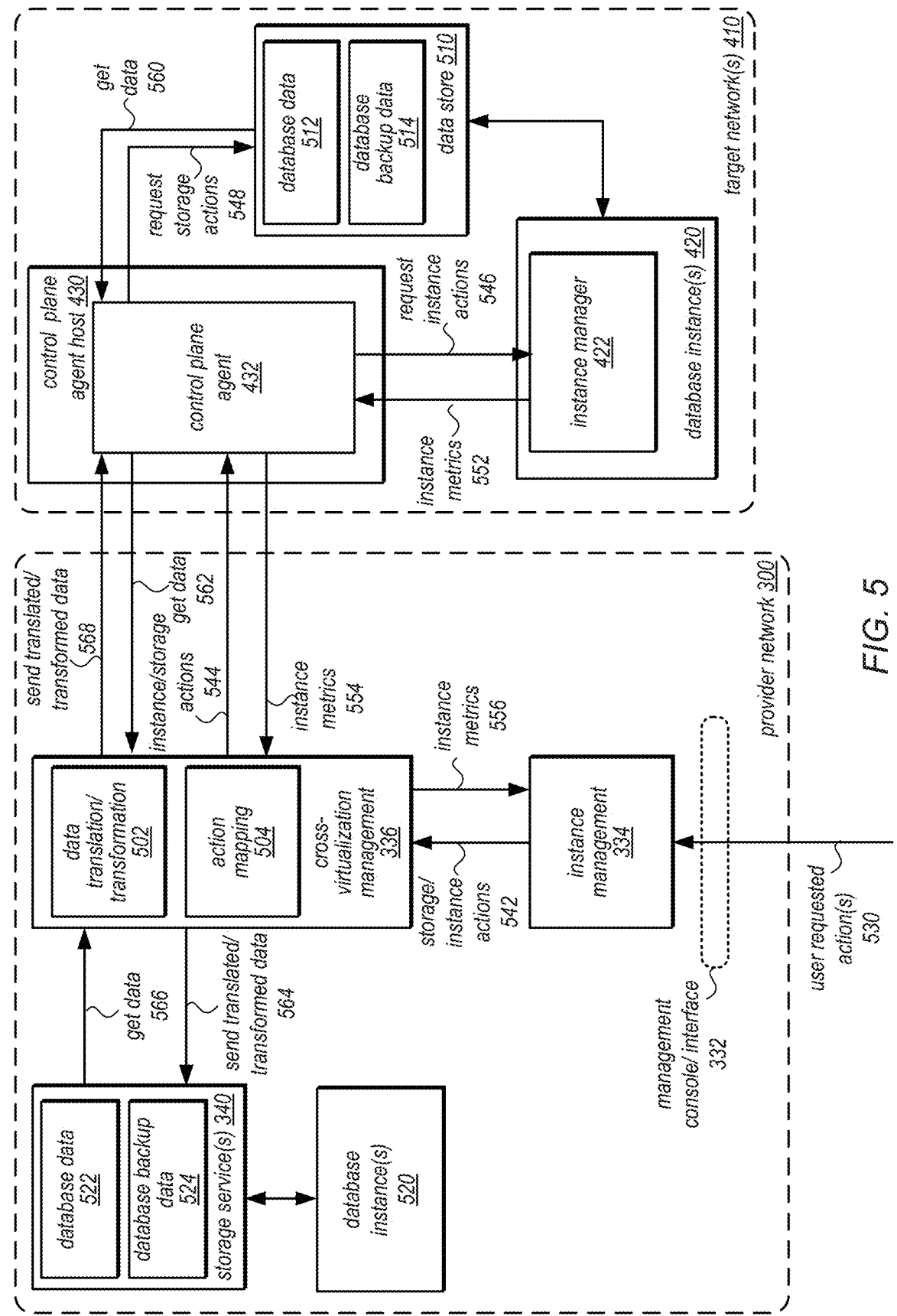
FIG. 5 is a logical block diagram illustrating interactions between a database service in a provider network and target networks in order to manage database instances in the target networks, according to some embodiments.

FIG. 5 is a logical block diagram illustrating interactions between a database service in a provider network and target networks in order to manage database instances in the target networks, according to some embodiments. User requested action(s) 530, such as those discussed below with regard to FIGS. 6, 7, and 8, may be provided via management console/interface 332 which may dispatch user request action(s) 530 to instance management 334 for performance. Similarly, instance management 334 may monitor instance metrics (either those obtained from database instances 420 in target network(s) 410 or from other database instances, such as database instance(s) 520) to perform various automated actions according to various thresholds, conditions, or other criteria that may trigger the performance of automated actions by monitoring the criteria. Instance management 334 may issue storage or instance actions 542 to cross virtualization management 336 which may utilization action mapping 504 to selectin the instance or storage actions to perform and send appropriate instructions 544 to control plane agent 432. Control plane agent 432 may then perform requested instance actions 546 and/or storage actions 548.

As illustrated in FIG. 5, performance metrics for database instance(s) 420 may be provided 552 to control plane agent 432, which in turn may report 554 them through cross virtualization management 336 to instance management 334, or to a metrics collection, reporting, monitoring service or system (not illustrated), in some embodiments. In at least some embodiments, data may be transferred as part of performing operations to create database replicas, backups, or other operations to migrate data between provider network 300 and target network(s) 410. In some embodiments, cross virtualization management 336 may implement data translation/transformation 502 which may convert data between data formats utilized at the different networks. For example, if control plane agent 432 gets data 560 from data store 510 (e.g., to create a replica in provider network 300), then control plane agent 432 may send the data 562 to cross-virtualization management 336. Data translation/transformation 502 may convert (e.g., encode/decode, encrypt/decrypt, reformat to change delimiters, header fields, or any other formatting operation) to send translated/transformed data to be stored as either part of database data 522 or database backup data 524 in a consistent or understandable format (e.g., converting from one backup format to another or combining multiple files or data objects into a single object).

Figure 6:
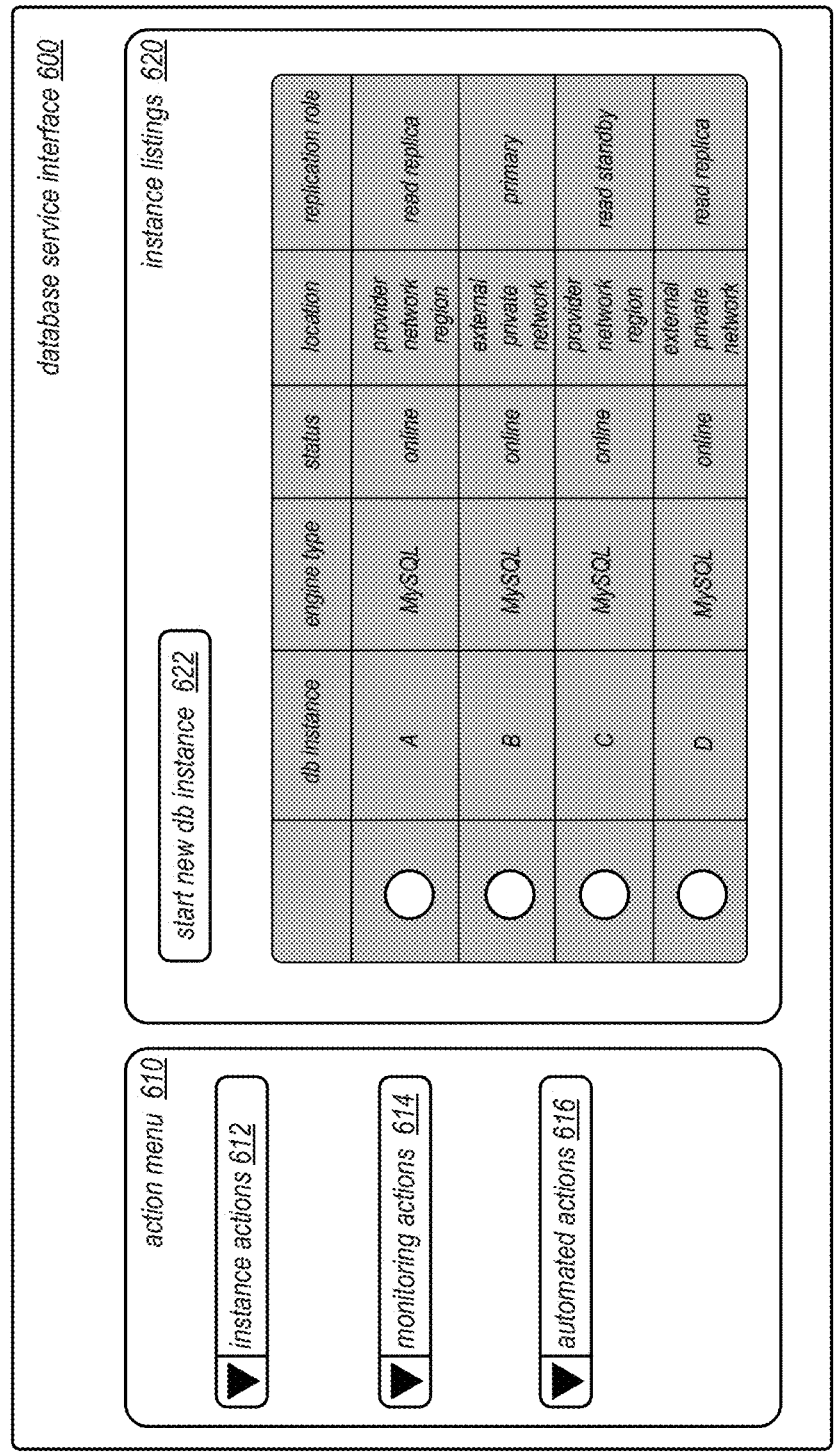
FIG. 6 is a logical block diagram illustrating an example graphical user interface of a database service for configuring types of actions that can be performed across virtualization platforms, according to some embodiments

FIG. 6 is a logical block diagram illustrating an example graphical user interface of a database service for configuring types of actions that can be performed across virtualization platforms, according to some embodiments. Database service interface 600 may be implemented as part of database service management console/interface 332. Instance listings 620 may illustrate instances available for management, including information such as instance name, engine type, status, location (which may indicate whether the instance is in a location using a different virtualization platform) and replication role, among other features. A graphical user interface element 622 may be implemented to start a new database instance, for example, and may include various user interface elements to configure the new database instance, including utilizing capacity in a target network implementing a different virtualization platform, in some embodiments.

Action menu 610 may provide an example of different types of actions that may be taken with respect to instances implemented within database service 310 or in a target network. For example, instance actions 612 may include actions to create a read replica database instance, promote a read replica to primary role, take a snapshot of database for restore, perform a restore operation, perform a migration from one instance to another, including across target networks and service boundaries, modify the configuration of an instance (e.g., security, engine, hardware allocation, etc.), reboot an instance, delete an instance, or other manually triggered operations, in some embodiments. Monitoring actions 614 may include metrics collections and event reporting actions which may be configured for a user based on metrics collected for a database instance across service and target network boundaries, including actions such as identifying metrics to collect, viewing collected metrics, configuring detection criteria for reporting events, triggering reporting mechanisms or systems, among others. Automated actions 616 may include configuring events that are automatically triggered based on performance metrics or other criteria or conditions, such as backup operations, recovery/failure/rollover operations, scaling operations, or other automated actions. In some embodiments, in the event an action is not support for an instance (e.g., due to a communication failure between a control plane and control plane agent, actions may become unavailable to select or may trigger error indications.

Figure 7:
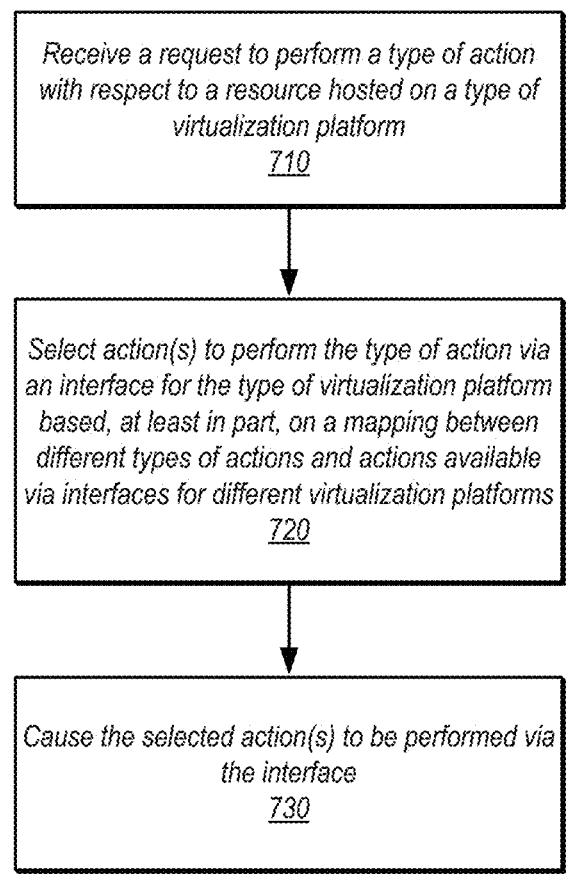
FIG. 7 is high-level flowchart illustrating various methods and techniques to implement managing hosted resources across virtualization platforms, according to some embodiments.

The networks and services discussed in FIGS. 2 through 6 provide examples of a system that may implement managing hosted resources across different virtualization platforms. However, various other types of systems may implement managing hosted resources across different virtualization platforms. For example, other kinds of database services, storage services, computation services, communication services or other systems that implement management or control plane features that can, for instance, automate various operations on behalf of users of those systems could implement managing hosted resources across different virtualization platforms in order to take advantage of and coordination operation between resources that provide a same or similar operation (e.g., similar or the same database engines, similar or the same computational engines, etc.) but are hosted in different locations and using different virtualization platforms. FIG. 7 is high-level flowchart illustrating various methods and techniques to implement managing hosted resources across different virtualization platforms, according to some embodiments. Various different systems and devices may implement the various methods and techniques described below, either singly or working together. For example, a control plane or other management system located in a private network may, for instance, be able to implement the various methods. Alternatively, a combination of different systems and devices may implement the various methods. Therefore, the above examples and or any other systems or devices referenced as performing the illustrated methods, are not intended to be limiting as to other different components, modules, systems, or configurations of systems and devices.

As indicated at 710, a request to perform a type of action with respect to a resource hosted on a type of virtualization platform, in some embodiments. Requests may be received from various sources. For example, in some embodiments, automated management or control plane operations may trigger the performance of different types of actions, such as a request from a health monitoring feature of a control plane to trigger a failover operation for the resource (e.g., to promote another resource to take over the resource, to provision, launch, configured, or otherwise prepare another resource, to ameliorate the burden placed on the resource by redirecting traffic or work on the resource). In some embodiments, requests may be received from a client system operated by a user of the resource that allows for different types of manually triggered actions to be performed with respect to a resource (e.g., a request to create a new resource, halt or otherwise modify performance of the resource, update or patch software applications that make up or implement some or all of the resource, take a snapshot or backup copy of the data used, accessed, or implemented as part of the resource, among others).

In various embodiments, the resource may be identified in the request. In some embodiments, the request for the type of action may not be formatted according to action or operation specified by an interface for the virtualization platform that hosts the identified resource. In some embodiments, the request may specify a type of action according to one type of virtualization platform that is different than the type of virtualization platform hosting the resource (e.g., a request formatted according to a native or bare-metal hypervisor that identifies a resource hosted in a hosted hypervisor, a request formatted according to a software container virtualization platform when the resource is hosted using a virtualization machine-based virtualization platform). In at least some embodiments, the resource may be hosted in a network (e.g., private or other provider network operated by a different entity) that is only accessible via a public network (e.g., a Wide Area Network such as the Internet). In some embodiments, the request may be formatted according to a generic interface that supports specifying types of actions independent of (or without identifying) any one virtualization platform (e.g., a backup operation or other function to perform with respect to data, a configuration or update operation with respect to an running application, etc.).

As indicated at 720, one or more actions may be selected to perform the type of action via an interface for the type of virtualization platform based, at least in part, on a mapping between different types of actions and actions available via interfaces for different virtualization platforms. For example, the type of virtualization platform may be recorded, registered, or otherwise stored as part of other information or metadata maintained for the resource in a control plane data store or management information, in some embodiments. When a resource is registered or identified to a management system, as discussed above with regard to FIG. 4, the virtualization platform type, along with other information for communicating with and/or managing the resource may be stored as part of registering the resource.

The request may be parsed, evaluated, or otherwise analyzed to obtain the type of request. The mapping information may be maintained as a knowledge-base that uses a rules-based or other decision engine for selecting the actions for the type of action and type of virtualization platform, in some embodiments. For example, decision trees of one or more actions corresponding to different virtualization platforms may be mapped to types of actions received in the request (e.g., a decision tree may indicate whether one or multiple actions are performed to accomplish a type of action based on the size, configuration, or other attribute of the resource in addition to the virtualization platform). In this way, selected actions may be further selected according to the characteristics of the resource in addition to the virtualization platform, in some embodiments, offering various benefits to the performance of the type of action (e.g., by choosing the optimal number of actions to accomplish a migration of a database—as a small database (which may be identified according to the decision tree) may be migrated using different actions than a large database which may be more efficiently migrated using other actions). In some embodiments, decision trees may be manually uploaded into a cross virtualization platform management system, as discussed above with regard to FIGS. 2-6, or machine learning systems (e.g., deep neural network modeling) may be used to program or design the decision trees according to performance, cost, or other features.

As indicated at 730, the selected one or more actions may be caused to be performed via the interface of the virtualization platform that hosts the resource, in various embodiments. For example, the selection action(s) may be caused by invoking corresponding APIs, workflows, operations, or other features that can be triggered using the interface. As discussed above with regard to FIGS. 4 and 5, a control plane agent or other system implemented in a same network as the resource may be sent requests to perform the actions, which in turn may perform the APIs or other operations with regard to the resource. In some embodiments, the selected action(s) may be performed directly from a control plane or other management system (e.g., by performing the API commands through a virtual private connection or other secure communication channel to the virtualization platform hosting the resource). In at least some embodiments, as discussed below, further operations may be performed in addition to the selection actions, such as converting data received from or sent to the resource into an appropriate format. Similar applying techniques to secure data (e.g., encryption techniques) or resize data (e.g., compression techniques) may be performed, in some embodiments.

Figure 8:
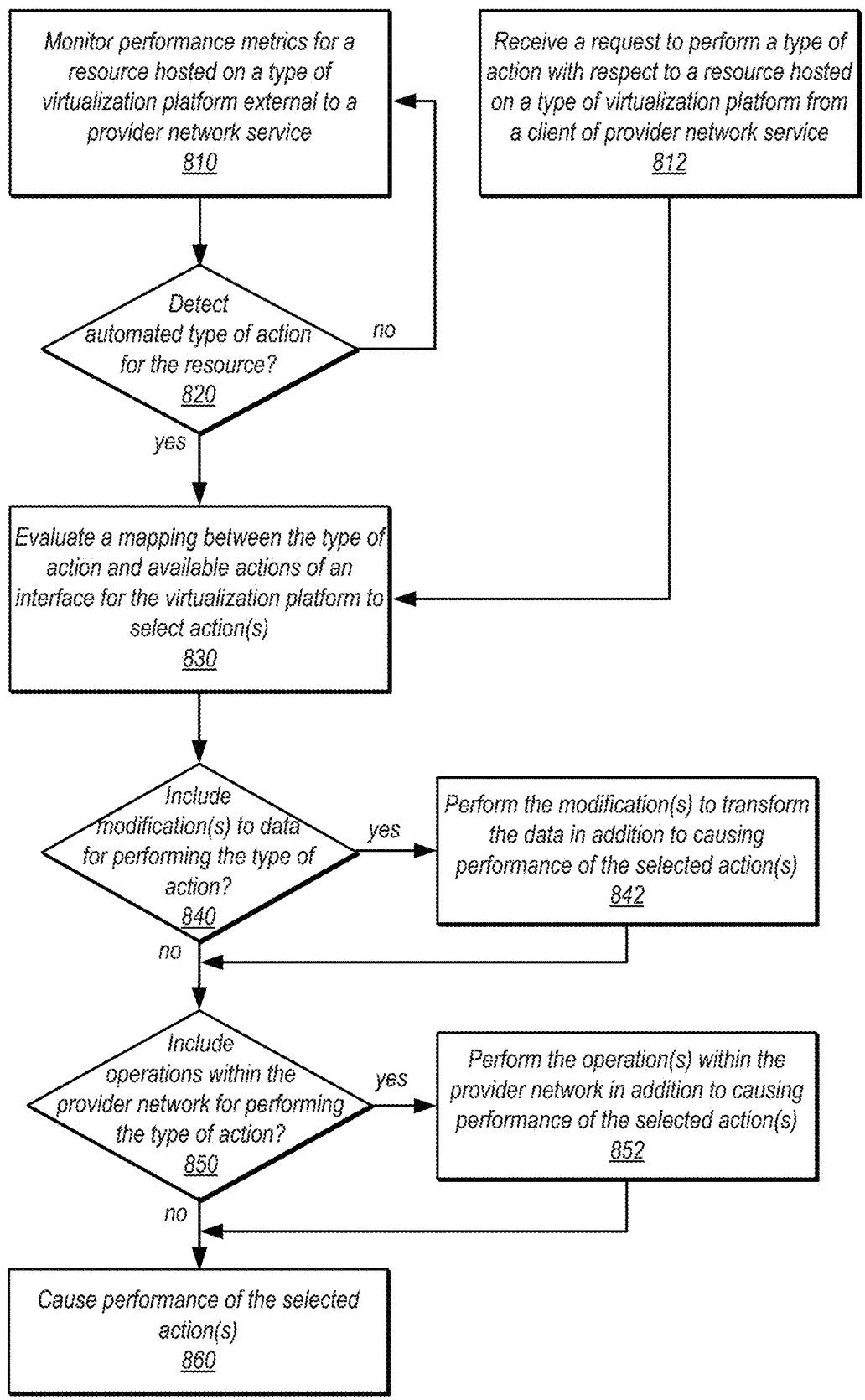
FIG. 8 is high-level flowchart illustrating various methods and techniques to implement automated and manually triggered types actions for hosted resources across virtualization platforms, according to some embodiments.

Techniques for managing hosted resources across different types of virtualization platforms allow for different management scenarios, triggers, or other events that cause different types of actions to be performed, in some embodiments. For resources hosted on virtualization platforms external to the network hosting a system that manages the resources, the capability to respond to the scenarios, triggers, or other events in different ways may enable greater coordination of resources. FIG. 8 is high-level flowchart illustrating various methods and techniques to implement automated and manually triggered types actions for hosted resources across virtualization platforms, according to some embodiments.

As indicated at 810, performance metrics may be monitored for a resource hosted on a type of virtualization platform external to a provider network service. Performance metrics may include resource utilization (e.g., storage, compute, network bandwidth, processor, I/O operations, etc.), request or operation measures (e.g., request latency/work per request), environmental metrics, such as temperature or power related information (which could trigger failure/recovery actions), or other metrics useful for evaluating with respect to automated action criteria. An automated type of action may be detected for the resource, as indicated by the positive exit from 820, based on the metrics, in some embodiments. For example, storage utilization thresholds or rate or request thresholds when exceeded may trigger scaling events. Failure to provide metrics may trigger failover or recovery operations, in some embodiments. Different criteria, conditions, or scenarios may be evaluated using performance metrics in order to detect automated actions (which may be configured by a user, as discussed above with regard to FIG. 6, in some embodiments).

As indicated at 812, a request to perform a type of action with respect to a resource hosted on a type of virtualization platform from a client of provider network service may be received, in various embodiments. Manual requests may also be received that trigger types of actions to perform, as discussed above with regard to FIGS. 5 and 6.

As indicated at 830, a mapping between the type of action and available actions of an interface for the virtualization platform may be evaluated to selection one or more actions, in various embodiments. As discussed above with regard to FIG. 7, the mapping information may be maintained as a knowledge-base that uses a rules-based or other decision engine for selecting the actions for the type of action and type of virtualization platform, in some embodiments. As indicated at 840, modification(s) to data for performing the type of action may be included as part of performing the type of action, in some embodiments. For example, if a data transfer is involved between different virtualization platforms (e.g., a creating a database system replica, moving a data object, loading an application or software image file from a target network), then modifications to the data may be needed in order to make the data understandable or usable to perform the type of action. As indicated by the positive exit from 840, the modifications may be performed to transform the data in addition to causing performance of the selected actions, as indicated at 842, in some embodiments. For example, the encoding of the file may be changed (e.g., changing from one image encoding to another, one database file format to another, one style of or structure of recording a data backup copy or snapshot to another).

As indicated at 850, operation(s) within the provider network for performing the type of action may be included as part of performing the type of action, in some embodiments. For example, corresponding operations to provision a resource in the provider network to host a read replica or launch another instance of the resource may be performed. As indicated by the positive exit from 850, the operations may be performed to the data in addition to causing performance of the selected actions, as indicated at 852, in some embodiments.

As indicated at 860, performance of the selected actions may be caused. For example, as discussed above with regard to FIG. 7, the selected actions may be caused by invoking corresponding APIs, workflows, operations, or other features that can be triggered using the interface.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
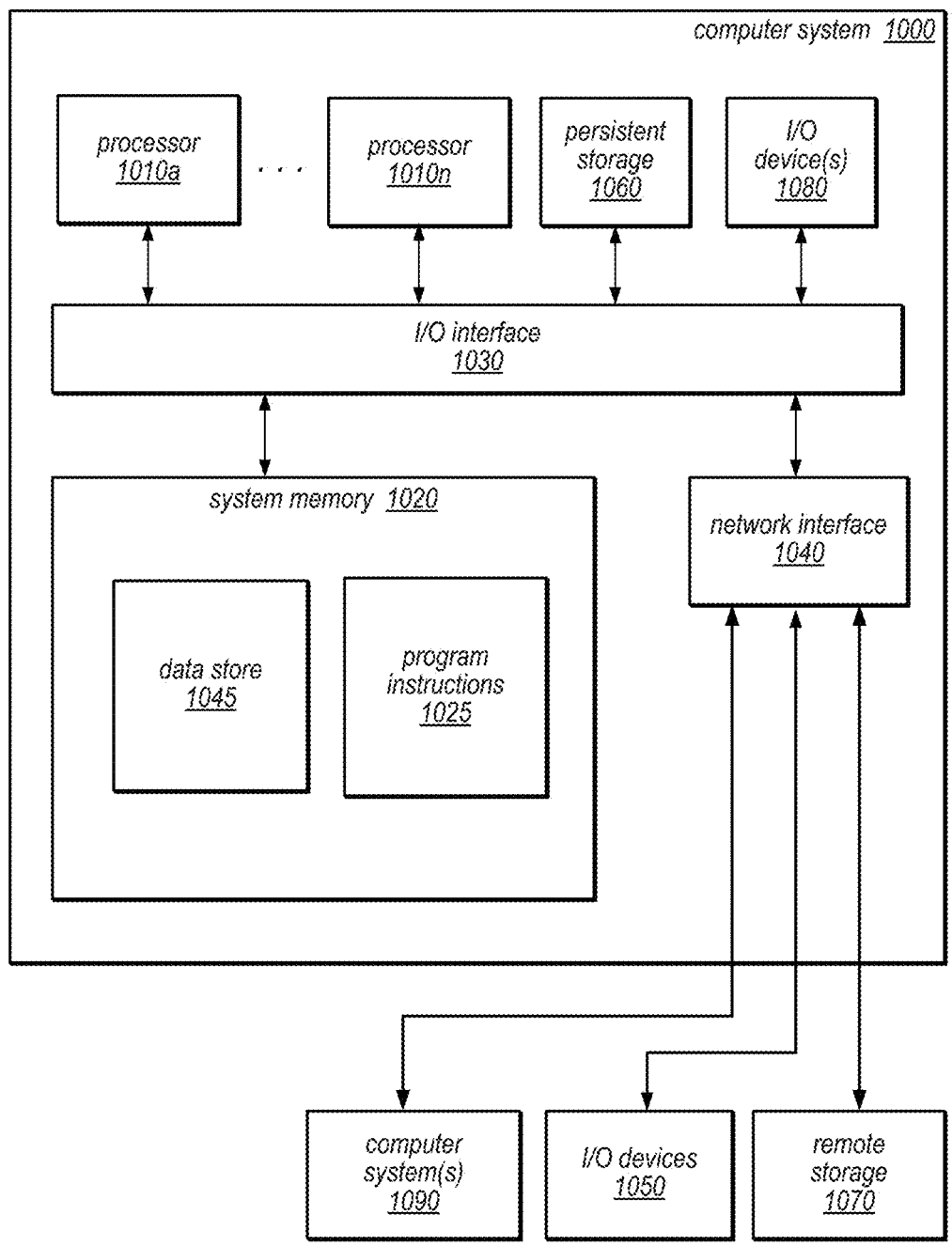
FIG. 9 is a block diagram illustrating an example computer system, according to various embodiments.

FIG. 9 is a block diagram illustrating an example computer system, according to various embodiments. For example, computer system 1000 may implement a control plane or management system or a host for resources implementing a virtualization platform, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may implement one or more nodes of a control plane or control system, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, as described herein. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive a request at a control plane for resources implemented in a first network to perform a type of requested action with respect to a resource hosted on a type of virtualization platform in a second network;
evaluate a mapping between different types of requested actions, and actions available via interfaces for different virtualization platforms in other networks, to select one or more of the available actions to perform the type of requested action via an interface for the type of virtualization platform; and
cause the one or more of the available actions to be performed via the interface with respect to the resource hosted in the second network.

2. The system of claim 1,
wherein the program instructions cause the at least one processor to further perform the method to at least:
perform one or more modifications to transform data to perform the type of requested action before sending the data to the second network; or
perform one or more modifications to transform data to perform the type of requested action after receiving the data from the second network.

3. The system of claim 1, wherein to cause the one or more of the available actions to be performed via the interface with respect to the resource hosted in the second network, the program instructions cause the at least one processor to perform the method to at least send one or more requests to a control plane agent hosted in a same network that hosts the resource to cause the control plane agent to initiate the one or more of the available actions via the interface.

4. The system of claim 1, wherein the control plane is a control plane for a database service implemented as part of a provider network, wherein the second network is private network, and wherein the resource is a database instance implementing a same type of database engine as implemented by other database instances hosted in the database service of the provider network.

5. A method, comprising:
responsive to a request to perform a type of requested action with respect to a resource hosted on a type of virtualization platform:
selecting one or more available actions to perform the type of requested action via an interface for the type of virtualization platform based, at least in part, on a mapping between different types of requested actions and available actions available via interfaces for different virtualization platforms; and
causing the one or more available actions to be performed via the interface.

6. The method of claim 5, further comprising performing one or more modifications to transform data for performing the type of requested action.

7. The method of claim 5,
wherein the request to perform the type of requested action is received at a control plane for resources implemented in a first network, wherein the resource is hosted in a second network; and
wherein the method further comprises performing one or more operations within the first network to perform the type of requested action.

8. The method of claim 5, further comprising:
receiving a request to perform a second type of requested action with respect to the resource; and
returning an error indication responsive to determining that the second type of requested action is unsupported for the resource.

9. The method of claim 5, further comprising:
monitoring performance metrics for the resource to detect an automated type of requested action for the resource; and
wherein the request to perform the type of requested action is generated in response to the detection of the automated type of requested action for the resource.

10. The method of claim 5, wherein the request to perform the type of requested action is received via an interface for a control plane of a service from a client of the service, wherein the service hosts at least one other resource on a different type of virtualization platform, and wherein the control plane is for both the at least one other resource and the resource, and wherein the resource is hosted external to the service.

11. The method of claim 5, wherein causing the one or more available actions to be performed via the interface comprises sending one or more requests to a control plane agent hosted in a same network that hosts the resource to cause the control plane agent to initiate the one or more available actions via the interface.

12. The method of claim 11, further comprising:
receiving a request for a control plane agent;
providing the control plane agent responsive to the request for the control plane agent; and
receiving an indication of the resource from the control plane agent in order to allow available actions to be performed with respect to the resource.

13. The method of claim 5, wherein the request to perform the type of requested action is received at a control system implemented in a first network that hosts resources according to a virtualization platform different than the virtualization platform that hosts the resource and wherein the resource is hosted in second network.

14. A non-transitory, computer-readable storage medium, storing program instructions that when executed by one or more computing devices cause the one or more computing devices to implement:

receiving a request to perform a type of requested action with respect to a resource hosted on a type of virtualization platform;
evaluating a mapping between different types of requested actions and available actions available via interfaces for different virtualization platforms to select one or more of the available actions to perform the type of requested action via an interface for the type of virtualization platform; and
causing the one or more of the available actions to be performed via the interface.

15. The non-transitory, computer-readable storage medium of claim 14, wherein the program instructions cause the one or more computing devices to further implement performing one or more modifications to transform data for performing the type of requested action.

16. The non-transitory, computer-readable storage medium of claim 14,
wherein the request to perform the type of requested action is received at a control plane for resources implemented in a first network, wherein the resource is hosted in a second network; and
wherein the program instructions cause the one or more computing devices to further implement performing one or more operations within the first network to perform the type of requested action.

17. The non-transitory, computer-readable storage medium of claim 14, wherein the request to perform the type of requested action is formatted according to first API for a first type of virtualization platform, wherein the type of virtualization platform hosting the resource is a second type of virtualization platform, and wherein the selected one or more of the available actions are formatted according to a second API for the second type of virtualization platform.

18. The non-transitory, computer-readable storage medium of claim 14, wherein the request to perform the type of requested action is received via an interface for a control plane of a service from a client of the service, wherein the service hosts at least one other resource on a different type of virtualization platform, and wherein the control plane is for both the at least one other resource and the resource, and wherein the resource is hosted external to the service.

19. The non-transitory, computer-readable storage medium of claim 14, wherein the request to perform the type of requested action is received at a control plane of a service offered by a provider network, wherein the resource hosted on the virtualization platform is hosted external to the provider network.

20. The non-transitory, computer-readable storage medium of claim 19, wherein the resource is hosted in another service offered by another provider network.

* * * * *